United States Patent [19]

Nagase et al.

[11] Patent Number: 4,595,789

[45] Date of Patent: Jun. 17, 1986

[54] SOLAR CELL ASSEMBLY

[75] Inventors: Eiichi Nagase, Chiba; Shinichiro Watari, Shiga, both of Japan

[73] Assignee: Kyocera Corporation, Japan

[21] Appl. No.: 604,915

[22] Filed: Apr. 27, 1984

[30] Foreign Application Priority Data

Apr. 30, 1983 [JP]  Japan ............................ 58-065186[U]
Jul. 25, 1983 [JP]  Japan ............................ 58-116223[U]

[51] Int. Cl.⁴ ........................................... H01L 25/02
[52] U.S. Cl. ..................................... 136/244; 136/251
[58] Field of Search ............... 136/244, 251, 259, 291, 136/293

[56] References Cited

U.S. PATENT DOCUMENTS 4,199,894  4/1980  Fischer ................................. 46/17

FOREIGN PATENT DOCUMENTS 56-94675  7/1981  Japan ................................. 136/251

Primary Examiner—Aaron Weisstuch
Attorney, Agent, or Firm—Spensley Horn Jubas & Lubitz

[57] ABSTRACT

The disclosure relates to a solar cell assembly comprising plural solar cell modules connected to each other. The overall output of the connected modules is delivered from the terminals of the first module. The input and output of the last module of the modules connected in series can be connected without wires. The output of the modules connected in parallel can be delivered from the terminals of the first module without wire connection.

8 Claims, 4 Drawing Figures

SOLAR CELL ASSEMBLY

BACKGROUND OF THE INVENTION

1. Field of the Invention

The present invention relates to a solar cell assembly composed of a plurality of solar cell modules connected in series, parallel, or series-parallel matrix to obtain a desired voltage and power capacity.

2. Prior Art

A solar cell assembly ordinarily comprises a connection of a plurality of identical modules, wherein a wire must be connected between the two terminals of the last module and be returned to the first module to deliver the overall output of the plural modules. In the case of the solar cell assembly comprising four modules 21, 22, 23, and 24 shown in FIG. 2, for example, a wire 28 must be connected between the terminals 24a and 24b of the last module to deliver the overall output between the terminals 21a and 21b of the first module 21.

In the case of the conventional solar cell assembly shown in FIG. 3, comprising four modules 31, 32, 33, and 34 connected with a single input/output line 38, wires 36 and 37 must be connected between the terminal 31a of the first module 31 and a terminal of the output plug 35 and between the terminal 34a of the last module 34 and the other terminal of the output plug 35.

In both cases, wires are required to obtain the output from the connected modules. Especially when many modules are connected, the wire connection is troublesome and wire breakage may occur.

SUMMARY OF THE INVENTION

It is therefore an object of the present invention to provide a solar cell assembly which forms a circuit capable of delivering the overall output of plural modules from the terminals of the first module when the modules are connected to each other, and to eliminate connecting wires which can be broken and which create inconvenience in the handling of the modules and the wiring of the connections.

DETAILED DESCRIPTION OF THE INVENTION

Figure 1:
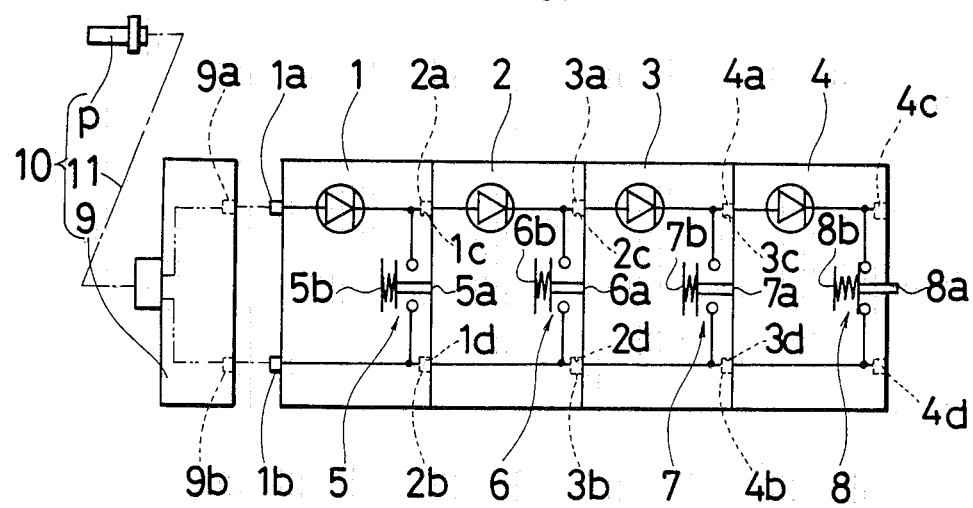
FIG. 1 is an explanatory drawing illustrating an embodiment of the present invention.
Figure 2:
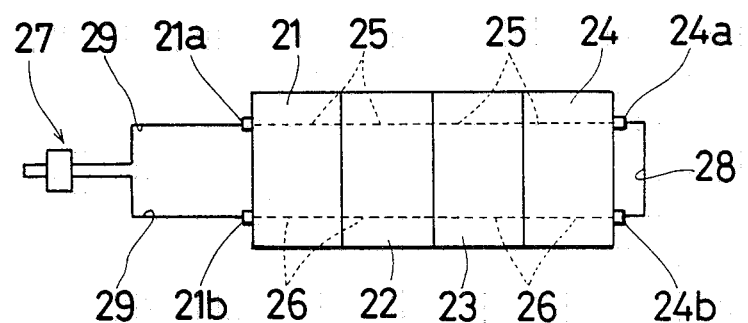
FIGS. 2 and 3 are explanatory drawings illustrating the connection examples of conventional modules.
Figure 3:
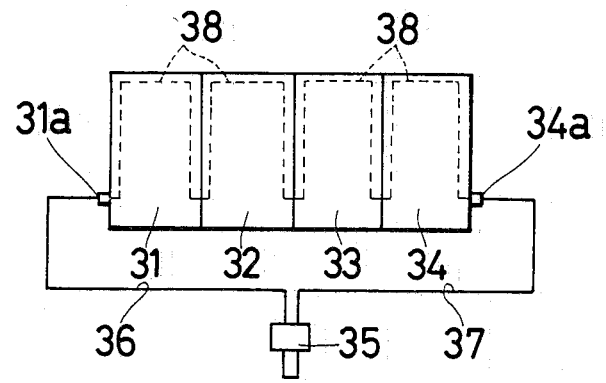

An embodiment of the present invention is described below referring to FIG. 1. The four solar cell modules 1, 2, 3, and 4 have terminals 1a, 1b, 2a, 2b, 3a, 3b, 4a, and 4b, with two terminals respectively on one side of each module, and have terminals 1c, 1d, 2c, 2d, 3c, 3d, 4c, and 4d, with two terminals respectively on the opposite side of each module. The modules can be connected mechanically by forming the terminals 1a, 1b, 2a, 2b, 3a, 3b, 4a, and 4b into a convex shape and by forming the terminals 1c, 1d, 2c, 2d, 3c, 3d, 4c, and 4d into a concave shape. More specifically, the module 2 is connected to the module 1 by fitting the convex terminals 2a and 2b of the module 2 into the concave terminals 1c and 1d of the module 1. The module 3 is connected to the module 2 by fitting the convex terminals 3a and 3b of the module 3 into the concave terminals 2c and 2d of the module 2. The module 4 is connected to the module 3 by fitting the convex terminals 4a and 4b of the module 4 into the concave terminals 3c and 3d of the module 3. In this way, the modules are connected one after another. In FIG. 1, each solar cell is indicated by the symbol of a diode.

A pair of input and output lines of each module is connected to each other via a switch. More specifically, the input line of 1a—solar cell—1c is connected to the output line of 1b—1d via the switch 5, the input line of 2a—solar cell—2c is connected to the output line of 2b—2d via the switch 6, the input line of 3a—solar cell—3c is connected to the output line of 3b—3d via the switch 7, and the input line of 4a—solar cell—4c is connected to the output line of 4b—4d via the switch 8.

The switch actuators 5a, 6a, 7a, and 8a are always pushed by the respective springs 5b, 6b, 7b, and 8b, and projected beyond the side walls of the respective module to be connected so that the switches are turned on when the modules are disconnected. When the modules 1, 2, 3, and 4 are connected to each other, the actuators 5a, 6a, and 7a are pushed back by the side walls on the connecting sides of the modules 2, 3, and 4 against the forces of the springs 5b, 6b and 7b. As a result, the switches 5, 6, and 7 are opened. However, the switch 8 of the module 4 remains in the closed position since no module pushes back the actuator 8a of the module 4. Accordingly, the input and output lines of the module 4 remain connected to each other via the switch 8 which remains on. In other words, the terminal 1a of the module 1 is connected to the solar cell of the module 1, 1c, 2a, the solar cell of the module 2, 2c, 3a, the solar cell of the module 3, 3c, 4a, the solar cell of the module 4, the switch 8, 4b, 3d, 3b, 2d, 2b, 1d and the terminal 1b of the module 1.

In this way, a return circuit is formed when these modules are connected. As a result, the overall output of the modules 1, 2, 3, and 4 which are connected in series can be delivered from the terminals 1a and 1b of the module 1.

The output terminal block 10 for the solar cell modules is composed of a socket 9, an output plug p and a cord 11 connecting the socket and the plug. Concave terminals 9a and 9b are formed on the side wall of the socket 9 to allow connection to the convex terminals of the module 1. By fitting the convex terminals of the module 1 into the concave terminals of the socket 9, the module 1 is directly connected to socket 9. More specifically, the convex terminals 1a and 1b of the module 1 are inserted into the concave terminals 9a and 9b of the socket 9 to obtain the overall output of the connected solar cell modules 1, 2, 3, and 4.

In this way, the modules 1, 2, 3, and 4 are integrated and the overall output of the modules can be delivered from the plug P which is connected to the socket 9 via the cord 11. The plug P is connected to an apparatus which requires the voltage delivered by the appropriate number of modules. The plug P in FIG. 1 is inserted into the cigarette lighter socket of a car for example to supply a battery charging voltage. In this case, the connected modules are installed on the dashboard or other places where they are exposed to sunlight.

Figure 4:
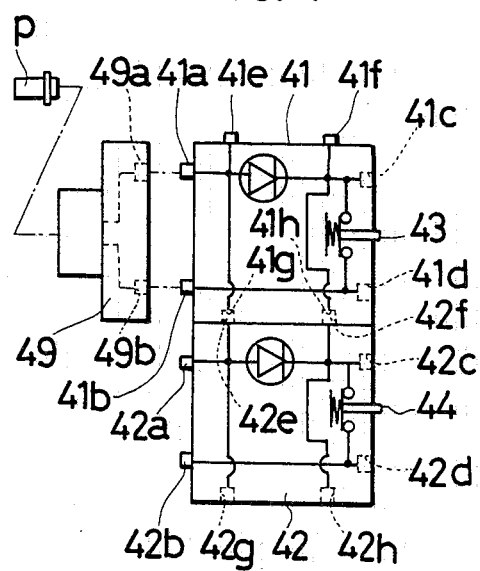
FIG. 4 is an explanatory drawing illustrating another embodiment of the present invention.

FIG. 4 shows an embodiment which is composed of parallelly connected modules to obtain the desired overall output.

The solar cell modules 41 and 42 shown in FIG. 4 are square and have connection sections to allow connection in series, parallel, or series-parallel matrix. More specifically, the module 41 has terminals 41a, 41b, 41c, 41d, 41e, 41f, 41g, and 41h on its four sides. In the same way, the module 42 has terminals 42a, 42b, 42c, 42d, 42e, 42f, 42g and 42h on its four sides. The terminals 41e and 41f are internally connected to the line between the terminal 41a, the solar cell of the module 41, and terminal 41c. The terminals 42e and 42f are internally connected to the line between the terminal 42a, the solar cell of module 42, and terminal 42c. Furthermore, the terminals 41f and 41h are internally connected to the line between the solar cell of the module 41 and the terminal 41c, and the terminals 42f and 42h are internally connected to the line between the solar cell of the module 42 and the terminal 42c. Since the modules 41 and 42 have the inter-connections as described above, they are connected in parallel when the terminals 41g and 41h of the module 41 are connected to the terminals 42e and 42f of the module 42. By connecting the terminals 49a and 49b of the socket 49 to the terminals 41a and 41b, or 41e and 41f of the module 41, or the terminals 42a and 42b of the module 42, the output of the two modules 41 and 42 connected in parallel can be delivered from the plug P.

The desired output can also be obtained from the plug P when the modules connected in series as illustrated in FIG. 1 and the modules connected in parallel as illustrated in FIG. 4 are further connected in a series-parallel matrix form.

When the terminals 42a and 42b of the module 42 are connected to the terminals 41c and 41d of the module 41 shown in FIG. 4, the switch 43 of the module 41 is opened and the two modules are connected in series. Thus the overall output of the two modules can be delivered across the terminals 41a and 41b of the module 41. This is obvious according to the above description to those of ordinary skill in the art.

In this way, any voltage and power capacity can be delivered as desired according to the power supply requirements by connecting plural modules as desired and by delivering the overall output from the output terminal block. In the case where the modules are used to recharge car batteries, the requisite number of modules can be determined as desired to meet any battery voltage level (12 V or 24 V) of any car. The modules connected as described above can also be installed on yachts and motor boats to recharge their batteries. Moreover, they can also be used to supply power to leisure goods or portable goods, or to recharge their batteries.

As described above, a pair of input and output lines of the module of the present invention are connected to each other via a switch. When plural modules are connected to each other, the switches of the preceding modules are opened and when the modules are not connected, the switches are closed Since the modules have these functions, when the modules are connected in series or series-parallel matrix, a return circuit to the first module is automatically formed by the connected modules. Thus the overall output of the connected modules can be delivered across the terminals of the first module.

Therefore, wire connection is not required to connect the modules. As a result, the connection can be easily done by non-professionals, and the connected modules have less space.

What is claimed is:

1. A solar cell assembly comprising first and second modules, each module comprising a solar cell, a pair of input terminals for series connection, a pair of output terminals for series connection provided on two sides of said module, a pair of input and output lines for series connection, by which lines said input and output terminals for series connection are connected to each other and said solar cell is connected to at least one of said lines, a pair of input terminals for parallel connection and a pair of output terminals for parallel connection provided on the other two sides of said module, and a pair of input and output lines for parallel connection, by which lines said input and output terminals for parallel connection are connected to each other and said pair of input and output lines for parallel connection are connected across said solar cell which is connected to said input or output line for series connection, said assembly further comprising a normally-on switch having means for turning the switch off when said input terminals for series connection of said first module are connected to said output terminals for series connection of said second module, said normally-on switch being connected across the output lines for series connection and opening when said input terminals for series connection of said first module are connected to said output terminals for series connection of said second module.

2. A solar cell assembly as claimed in claim 1, wherein a said module has a square shape, and said pairs of input and output terminals for series connection are provided on two sides of said module opposite to each other, and said pairs of input and output terminals for parallel connection are provided on the other two sides opposite to each other.

3. A solar cell assembly comprising first and second modules, each module comprising a solar cell, a pair of input terminals for series connection, a pair of output terminals for series connection provided on two sides of said module, a pair of input and output lines for series connection, by which lines said input and output terminals for series connection are connected to each other and said solar cell is connected to at least one of said lines, a pair of input terminals for parallel connection and a pair of output terminals for parallel connection provided on two other sides of said module, and a pair of input and output lines for parallel connection, by which lines said input and output terminals for parallel connection are connected to each other and said pair of input and output lines for parallel connection are connected across said solar cell which is connected to said input or output line for series connection, said assembly further comprising an output terminal block which has terminals coupleable to said output terminals for series connection or to said output terminals for parallel connection so that the output of either series or parallel connected modules can be delivered.

4. A solar cell assembly as claimed in claim 3, wherein said output terminal block comprises a socket, an output plug, and a cord to connect said socket to said output plug.

5. A solar module for use with another similar module, the solar module comprising:
   an output terminal;
   an input terminal adapted to be coupled to the output terminal of another module;
   a solar cell having an output; and
   a switch, coupled to the solar cell output and actuable upon coupling the module input terminal to the output terminal of another module, for uncoupling the solar cell output from the module output terminal when the module input terminal is coupled to the output terminal of another module.

6. A solar module comprising:
a solar cell;
a first input terminal coupled to the solar cell input;
a first output terminal coupled to the solar cell output and adapted to be coupled to the first input terminal of another module to couple the solar cells of the coupled modules in series;
a return line having a second output terminal and a second input terminal which is adapted to be coupled to a similar second output terminal of another module to couple the return lines of the coupled modules in series; and
switch means having a closed position for coupling the series-connected cells in series with the series-connected return lines, said switch means being open when the first output terminal of the module is coupled to the first input terminal of another module.

7. The module of claim 6 further comprising:
a third output terminal and a third input terminal which is coupled to the first input terminal and the cell input, said third output terminal being adapted to be coupled to the third input terminal of another module; and
a fourth output terminal and a fourth input terminal which is coupled to the first output terminal and the cell output, said fourth output terminal being adapted to be coupled to the fourth input terminal of another module;
wherein the cell of the module may be coupled in parallel with the cell of another module by coupling the third and fourth output terminals of the module to the third and fourth input terminals of another module.

8. A solar module comprising:
a solar cell having an input and an output;
a return line having an input and an output;
a first input terminal coupled to the cell input;
a first output terminal coupled to the cell output;
a second input terminal coupled to the return line input;
a second output terminal coupled to the return line output; and
switch means for coupling the cell output to the return line input, and for uncoupling the cell output from the return line input when the module first output terminal and second input terminal are coupled to the terminals of another module.

* * * * *